(12) United States Patent
Kellgren et al.

(10) Patent No.: US 8,209,654 B2
(45) Date of Patent: Jun. 26, 2012

(54) METHODOLOGY FOR STORING AND UPDATING ON-CHIP REVISION LEVEL

(75) Inventors: Tore Lennart Kellgren, San Jose, CA (US); J. Antonio Salcedo, Livermore, CA (US)

(73) Assignee: Exar Corporation, Fremont, CA (US)

(*) Notice: Subject to any disclaimer, the term of this patent is extended or adjusted under 35 U.S.C. 154(b) by 191 days.

(21) Appl. No.: 12/691,973

(22) Filed: Jan. 22, 2010

(65) Prior Publication Data

US 2011/0185337 A1 Jul. 28, 2011

(51) Int. Cl.
*G06F 11/22* (2006.01)
*G06F 17/50* (2006.01)

(52) U.S. Cl. ......... 716/136; 716/111; 716/126; 716/138

(58) Field of Classification Search .............. 716/111, 716/126, 136, 138
See application file for complete search history.

(56) References Cited

U.S. PATENT DOCUMENTS

| 4,446,534 | A | * | 5/1984 | Smith | 365/96 |
| 6,009,253 | A | * | 12/1999 | Srivatsa et al. | 327/285 |
| 2005/0274966 | A1 | * | 12/2005 | Matsunaga | 257/96 |
| 2007/0131966 | A1 | * | 6/2007 | Catalasan et al. | 257/181 |
| 2008/0054985 | A1 | * | 3/2008 | Tsai et al. | 327/427 |
| 2008/0258255 | A1 | * | 10/2008 | Ker et al. | 257/529 |
| 2010/0187574 | A1 | * | 7/2010 | Catalasan et al. | 257/211 |

\* cited by examiner

*Primary Examiner* — Thuan Do
*Assistant Examiner* — Nha Nguyen
(74) *Attorney, Agent, or Firm* — Fliesler Meyer LLP (57) ABSTRACT

Logic to indicate a revision level includes multiple cells for one bit of the revision level. The cells being wired to be a pass-through cell or a swap cell during fabrication. At least some of the cells are such that to change the bit of the revision level, it is sufficient to change any single mask of a group of masks. The change to the single mask switches at least one of the cells from pass-through cell to a swap cell, or vice-versa.

22 Claims, 7 Drawing Sheets

502
determining what set of one or more masks would need to be changed to modify other parts of an integrated circuit besides revision level logic, the revision level logic being used indicate a revision level of the integrated circuit, the revision level logic including multiple cells for one bit of the revision level, the cells being wired to be a pass-through cell or a swap cell during fabrication, the individual cells being associated with different masks of a group of masks, wherein to change the at least one bit of the revision level, a change to any single mask of the group of masks can be made 504
selecting a single mask to modify the revision level logic; the single mask being in the set of one or more masks and in the group of masks, the modification including modifying the single mask to switch one of the cells from a pass-through cell to a swap cell, or vice-versa

FIGURE 1

PASS-THROUGH

FIGURE 2A

SWAP

502 determining what set of one or more masks would need to be changed to modify other parts of an integrated circuit besides revision level logic, the revision level logic being used indicate a revision level of the integrated circuit, the revision level logic including multiple cells for one bit of the revision level, the cells being wired to be a pass-through cell or a swap cell during fabrication, the individual cells being associated with different masks of a group of masks, wherein to change the at least one bit of the revision level, a change to any single mask of the group of masks can be made

504 selecting a single mask to modify the revision level logic; the single mask being in the set of one or more masks and in the group of masks, the modification including modifying the single mask to switch one of the cells from a pass-through cell to a swap cell, or vice-versa

FIGURE 5

METHODOLOGY FOR STORING AND UPDATING ON-CHIP REVISION LEVEL

FIELD OF THE INVENTION

The present invention relates to means of identifying integrated circuit (IC) chips. More particularly, the present invention relates to means to update revision level information for a revised chip design.

BACKGROUND

Semiconductor device fabrication involves a number of processing steps including implant steps, deposition steps, and metallization steps. Many of these steps include forming patterns in a photoresist layer using a mask. The light from an exposure system shines through the mask which blocks light in some areas and lets it pass in others. The light results in chemical changes to exposed portions of the photoresist to form a pattern.

The patterned photoresist can then be used to create a layer on the wafer. For example, for a metallization layer, metal can be deposited on the patterned photoresist and the later removal of the photoresist forms the patterned metallization layer.

The masks are created using computer design tools from a circuit design. These design tools, among other things, optimize the masks so that the integrated circuit design can be placed on a small wafer.

A chip is often revised after initial manufacture for purposes of correcting minor design defects, or otherwise making minor changes, by modifying a subset of the mask layers comprising the design. As part of the revision of the chip, the revision level identifier is also updated.

The revision level of the chip is commonly contained in one or more read only registers, some accessible by system software and others accessible by Joint Test Action Group (JTAG), the common name for what was later standardized as the IEEE 1149.1 Standard Test Access Port and Boundary-Scan Architecture. When the revision level of a chip is synthesized, an arbitrary number of masks are used to create the bit pattern making up the hardwired content. This often forces changes to masks exclusively for the purpose of updating the content of one or more revision level registers. Revising masks exclusively for the purpose of updating the revision level registers is undesirable since creating a new mask results in additional expense.

SUMMARY

The present invention is a method for changing content to the revision level registers by modifying any single mask of a group of masks, thereby eliminating the need to change masks only for the purpose of updating the revision level. Once it is determined what mask is to be changed for other revisions of the chip, this mask can also be modified to update the revision level information on the chip.

For each modifiable bit of the revision level, revision level logic includes cells associated with different masks. Each of these cells can be modified by a change to a corresponding mask. The cells are arranged in series such that a change of one cell propagates through the following cells to switch the bit of the revision level. A change of a single mask can update the entire revision level by modifying specific cells to switch the bit pattern of the revision level.

The cells are designed to be wired as a pass-through cell or a swap cell during fabrication with a change to the single mask. The pass-through cells keep the output value the same as the input value. The swap cells invert the input value to form the output value.

DETAILED DESCRIPTION OF THE INVENTION

Figure 1:
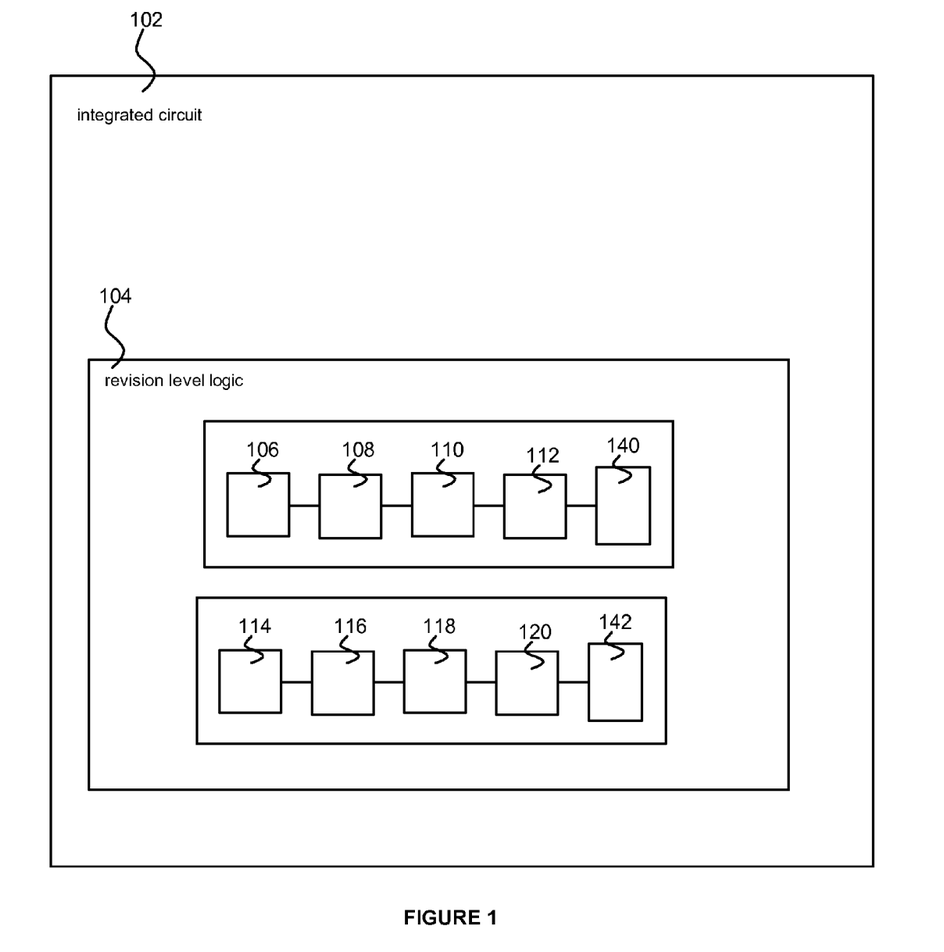
FIG. 1 shows an exemplary integrated circuit with revision level logic of the present invention.

FIG. 1 shows an integrated circuit 102 comprising logic 104 to indicate a revision level. The logic 104 includes multiple cells 106, 108, 110 and 112 for one bit of the revision level. At least some of the cells 106, 108, 110 and 112 are wired to be either a pass-through cell or a swap cell during fabrication. The cells are such that to change the any bit of the revision level, it is sufficient to change a single mask of a group of masks. The change to the single mask switches one of the cells from a pass-through cell to a swap cell, or vice-versa.

In the example of FIG. 1, each cell 106, 108, 110 and 112 corresponds to a different mask. A bit of the revision level can be modified by modifying any cell 106, 108, 110 and 112 associated with any of the different masks. Similarly, another bit of the revision level can be changed in the same way with changes to any cell 114, 116, 118 and 120. For example, cell 114 and cell 106 can be modified by a change to a first mask; cell 116 and 108 can be modified with a change to a second mask, and so on.

The bit values propagate through the logic and are stored in the registers 140 and 142. The revision level bits at the registers 140 and 142 are accessible by Joint Test Access Group (JTAG) access or by an internal process.

The cells for the bit of the revision level are arranged such that a switch of any cell from a pass-through cell to a swap cell switches the bit of the revision level. In the example of FIG. 1, the cells for the bit are arranged in series so that an output change to one cell propagates through the following cells to switch the revision level bit at the register.

In this way, the revision level is adjustable to another revision level by changing a single mask. If needed, the change to the single mask changes multiple bits of the revision level.

In one example, consider a design including masks A-G. Assume that an exemplary revision would change masks A, B, and E independent of a change to the revision level. If the revision level logic of the present invention has bits with cells adjustable independently by any one of masks B-F, then masks B or E can be adjusted to change the revision level without requiring an additional mask to be modified. This is different from prior systems in which arbitrary mask(s), such as masks C and D, may have to be changed just to modify the revision level.

Figure 2A:
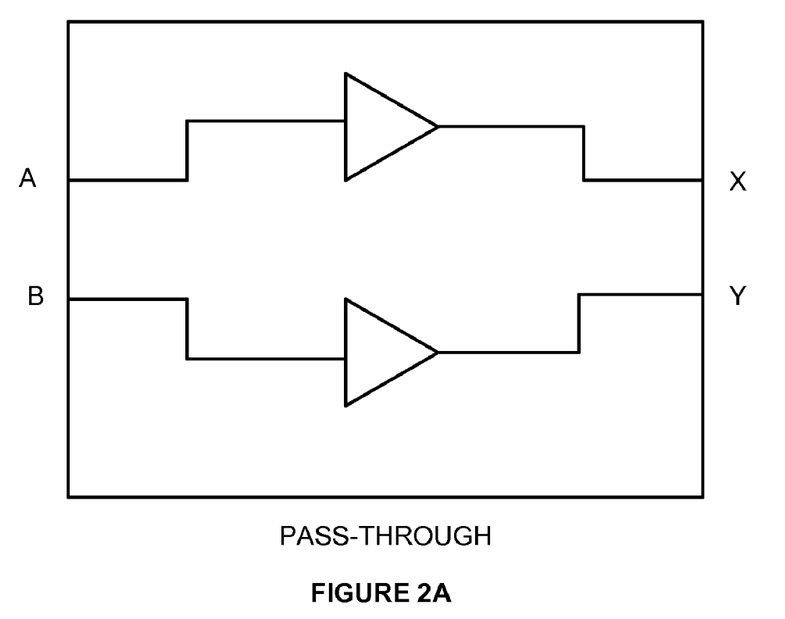
FIGS. 2A and 2B show examples of a pass-through cell and a swap cell, respectively.
Figure 2B:
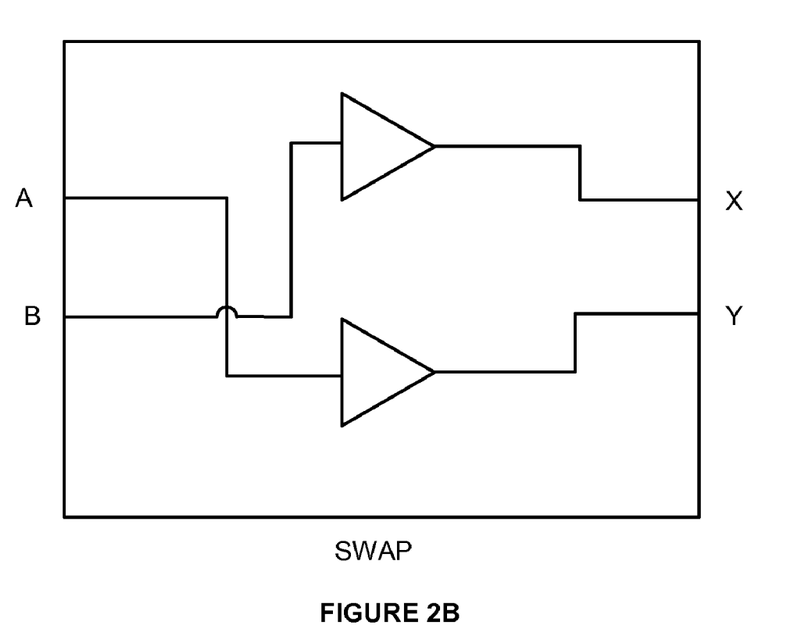

The two types of cells, a pass-through cell, shown in FIG. 2A, and a swap cell, shown in FIG. 2B, have identical footprints. These cells differ only in a single mask layer. The logic functions of the cells are:

Cells of type Pass-through
X=A;

Y=B;
Cell of type Swap
X=B;
Y=A;

The pass-through and swap cells differ only in the routing of the A and B inputs. The difference in this routing in each cell pair is realized with a single mask layer. There is a cell for each metal layer, as well as a cell for any other layer that might be individually revised in the design, (e.g. diffusion, contact or via for ROMs, Poly or Well for resistors, etc. . . . )

Cells associated with implant masks can have associated pass-through or swap cells similar to those discussed above. Alternately, the cells associated with implant masks can set the initial values that propagate through the other cells by creating transistors that connect to ground or the power voltage, $V_{DD}$.

A string of pass-through cells are initially instantiated between hard wired data and the D-input of a revision level register. The directive "do_not_touch" can be used to prevent the computer tool from changing a cell in an undesirable optimization. Each bit in the revision level has one cell for each mask layer expected to need revision.

To later modify a bit of the revision level, a pass-through cell is replaced with a swap cell (or a swap cell with a pass-through cell in later revisions if that mask layer is again revised) inverting the content of the revision level register for that bit from its previous value.

Figure 3A:
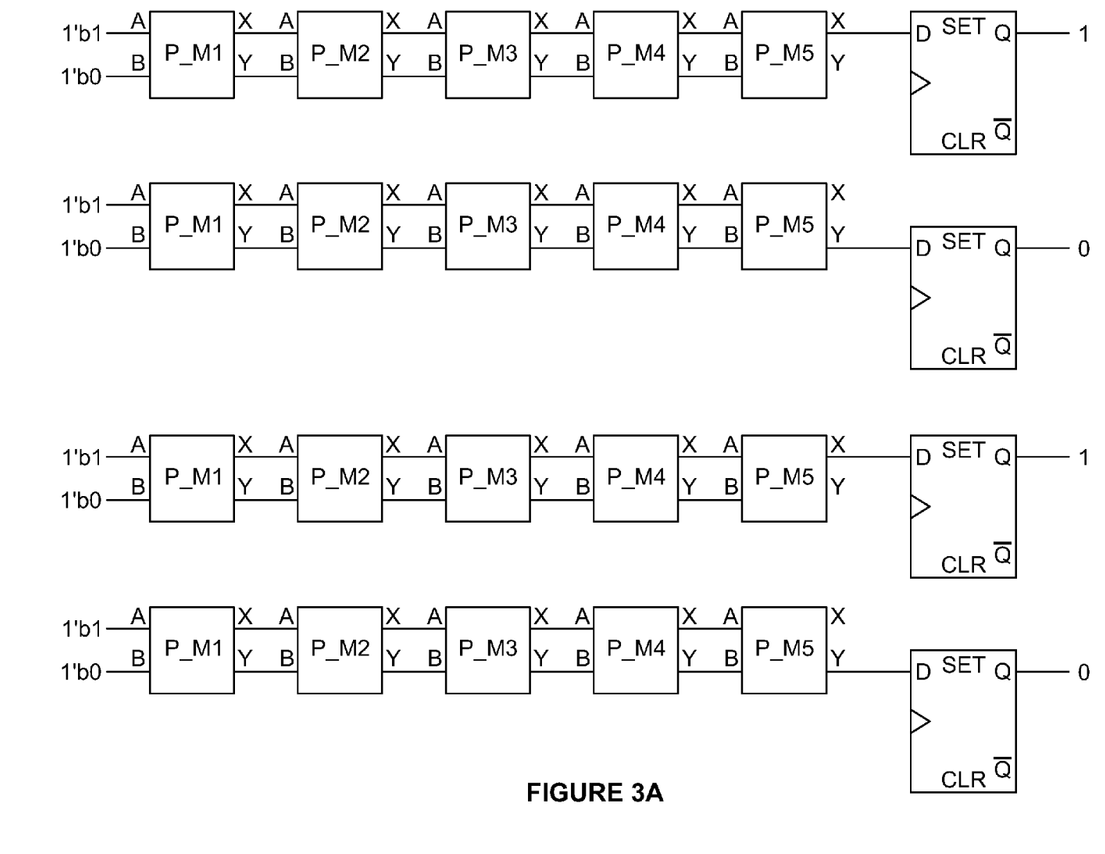
FIGS. 3A-3C show examples illustrating modifying a single mask to change the revision levels.
Figure 3B:
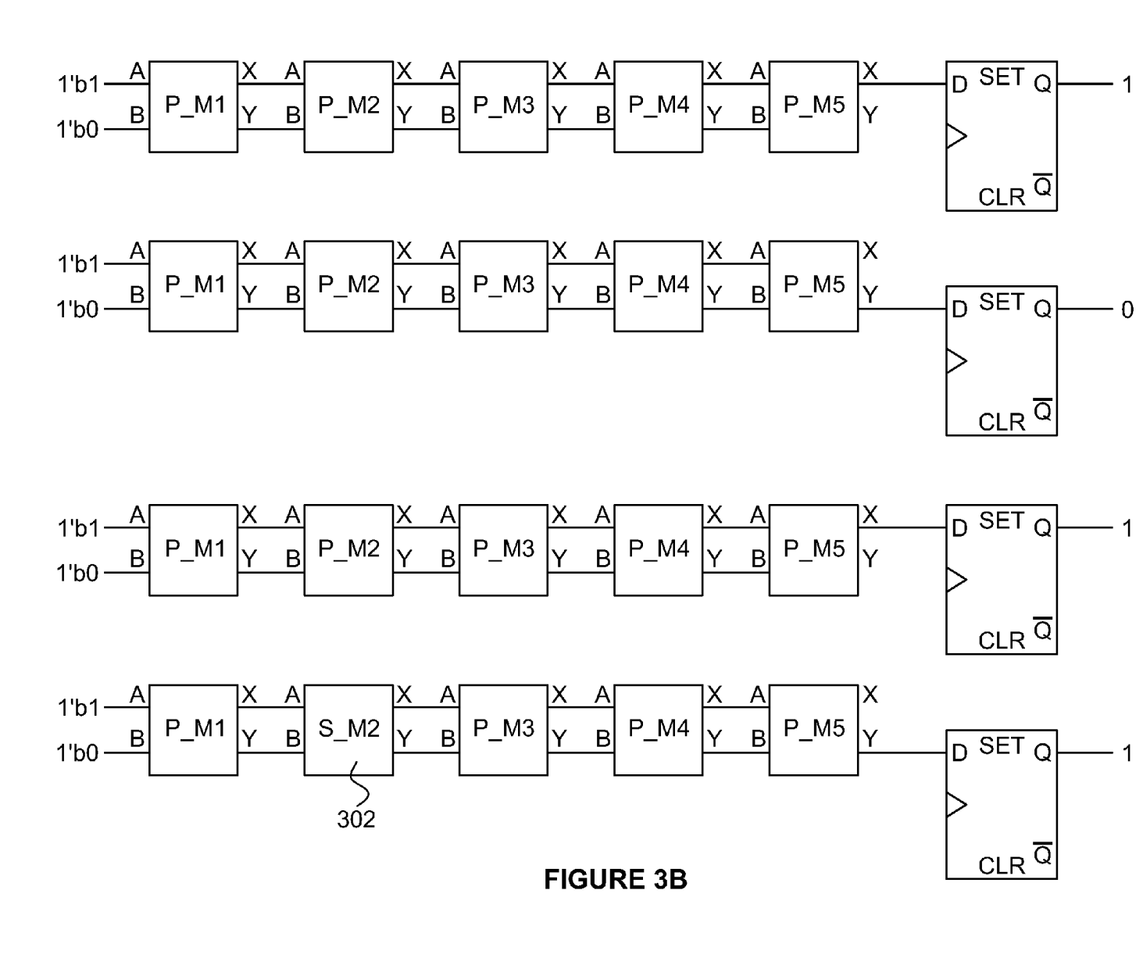
Figure 3C:
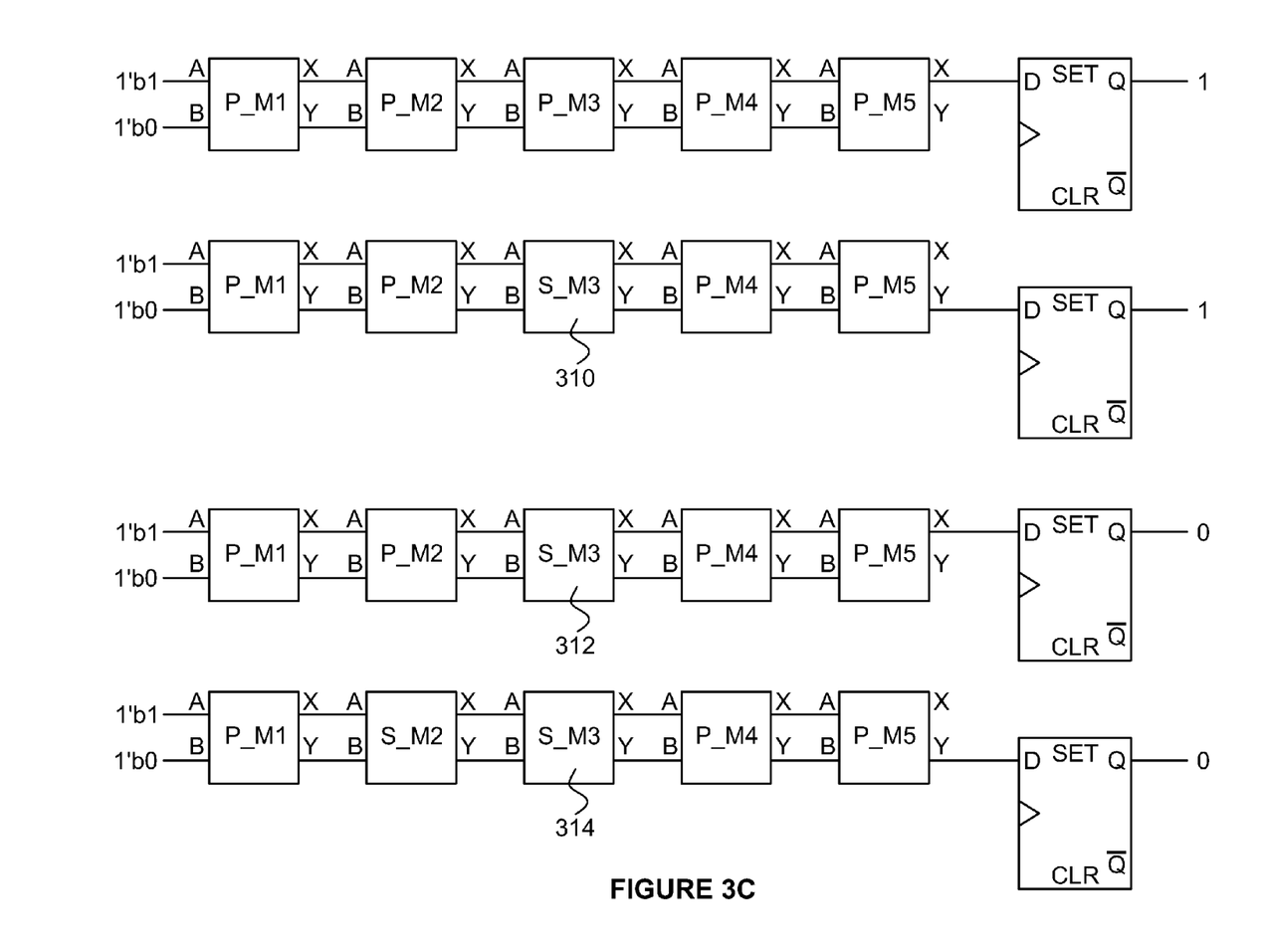

FIGS. 3A-3C show an example. A 5-layer metallization chip was originally designated with revision level A (1010). As shown in FIG. 3A, the initial revision level value was implemented by selecting the X output from last cells for logic ONE and the Y output from the last cells for logic ZERO. Alternately, the inputs to the cells can be adjusted, or certain cells can originate as swap cells in order to set the initial revision level.

In this example, any one of the metallization masks M1-M5 can be modified to modify the revision level. As shown in the example of FIG. 3B, the revision level was revised to B (1011) by changing the second metallization mask (M2) only. In this example, cell 302 is changed to be a swap cell.

As shown in FIG. 3C, the revision level was subsequently revised again from B (1011) to C (1100) by changing the third metallization mask (M3) only. In this example, cells 310, 312 and 314 are changed to be swap cells. Note that the least significant bit of the revision level was changed back to its original value.

Figure 4:
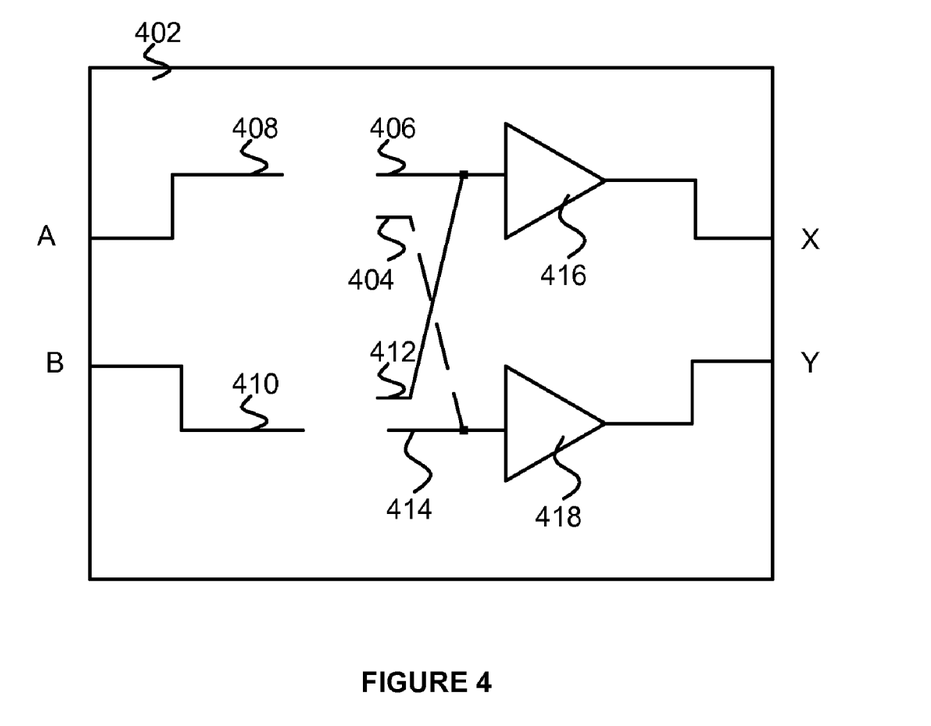
FIG. 4 shows an exemplary layout for the pass-through and swap cells.

As shown in FIG. 4, the cell 402 can include connection to a shunt 404 or a straight connection 406. The shunt 404 uses additional mask layers, but these additional mask layers do not need modification to change the cell from a pass-through cell to a swap cell, or vice-versa.

Using one mask layer to make the connections, input 408 can connect to wire 406 (for pass-through) or shunt 404 (for swap); and input 410 can connect to wire 414 (for pass-through) or wire 412 (for swap).

Figure 5:
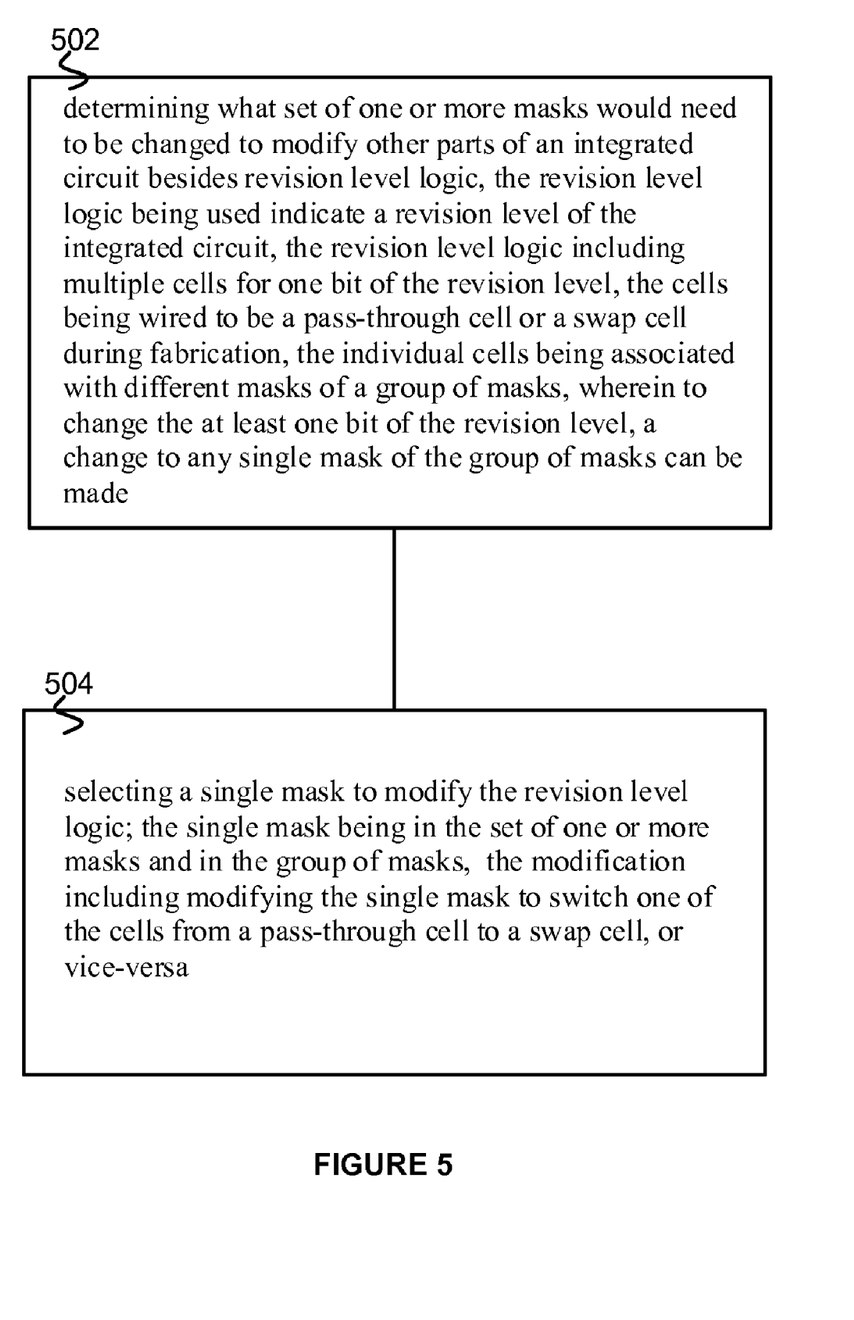
FIG. 5 shows a flow chart of a method of the present invention.

FIG. 5 shows a flowchart of one embodiment. In step 502, a set of one or more masks that would need to be changed to modify other parts of an integrated circuit besides revision level logic is determined. The revision level logic indicates a revision level of the integrated circuit. The revision level logic includes multiple cells for one bit of the revision level. The cells being wired to be a pass-through cell or a swap cell during fabrication. The individual cells being associated with different masks of a group of masks. To change the at least one bit of the revision level, a change to any single mask of the group of masks can be made.

In step 504, a single mask is selected to modify the revision level logic. The single mask is one of the set of one or more masks and one of the group of masks. The modification modifies the single mask to switch one of the cells from a pass-through cell to a swap cell, or vice-versa.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. An integrated circuit comprising:
   logic to indicate a revision level, the logic including multiple cells for a bit of the revision level, the cells being wired to be either a pass-through cell or a swap cell during fabrication;
   wherein the at least some of the cells are such that to change the bit of the revision level, it is sufficient to change any single mask of a group of masks during fabrication, the change to the single mask switching one of the cells from pass-through cell to a swap cell or vice-versa;
   further comprising at least one non-metallization layer that produces a transistor connected to ground or to power;
   wherein a change to the at least one non-metallization layer to switch the connection to power or to ground is used to change the bit;
   wherein the revision level includes multiple bits, and
   wherein the revision level is adjustable to another revision level by changing the single mask.

2. The integrated circuit of claim 1, wherein the change to the single mask changes multiple bits of the revision level.

3. The integrated circuit of claim 1, wherein the cells for the bit of the revision level are arranged such that a switch of any cell from a pass-through cell to a swap cell switches the bit.

4. The integrated circuit of claim 3, wherein the cells for the bit of the revision level are arranged in series.

5. The integrated circuit of claim 1, wherein the cells include a shunt to enable a shunt connection; and wherein the change of the cell from a swap cell to a pass-through cell, or vice-versa, switches between the shunt connection to a straight connection, or vice-versa.

6. The integrated circuit of claim 1, wherein the cells include at least one buffer element.

7. The integrated circuit of claim 6, wherein the buffer element is an amplifier.

8. The integrated circuit of claim 1, wherein the bit of the revision level is stored with a register.

9. The integrated circuit of claim 1, wherein the revision level is accessible by Joint Test Access Group (JTAG) access.

10. The integrated circuit of claim 1, wherein the non-metallization layer is an implant layer.

11. The integrated circuit of claim 1, wherein the non-metallization layer is a poly layer.

12. A method comprising:
    determining what set of one or more masks would need to be changed to modify other parts of an integrated circuit besides revision level logic, the revision level logic being used indicate a revision level of the integrated circuit, the revision level logic including multiple cells for one bit of the revision level, the cells being wired to be a pass-through cell or a swap cell during fabrication, the individual cells being associated with different masks of a group of masks, wherein to change the at least one bit of the revision level, a change to any single mask of the group of masks can be made;

selecting a single mask to modify the revision level logic; the single mask being one of the set of one or more masks and one of the group of masks, the modification including modifying the single mask to switch one of the cells from a pass-through cell to a swap cell, or vice-versa;

further comprising at least one non-metallization layer that produces a transistor connected to ground or to power;

wherein a change to the at least one non-metallization layer to switch the connection to power or to ground is used to change the bit; and wherein the revision level includes multiple bits, and wherein the revision level is adjustable to another revision level by changing the single mask.

13. The method of claim 12, wherein the change to the single mask changes multiple bits of the revision level.

14. The method of claim 12, wherein the cells for the bit of the revision level are arranged such that a switch of any cell from a pass-through cell to a swap cell switches the bit.

15. The method of claim 14, wherein the cells for the bit of the revision level are arranged in series.

16. The method of claim 12, wherein the cells include a shunt to enable a shunt connection; and wherein the change of the cell from a swap cell to a pass-through cell, or vice-versa, switches between the shunt connection to a straight connection, or vice-versa.

17. The method of claim 12, wherein the cells include at least one buffer element.

18. The method of claim 17, wherein the buffer element is an amplifier.

19. The method of claim 12, wherein the bit of the revision level is stored with a register.

20. The method of claim 12, wherein the revision level is accessible by Joint Test Access Group (JTAG) access.

21. The method of claim 12, wherein the non-metallization layer is an implant layer.

22. The method of claim 12, wherein the non-metallization layer is a poly layer.

* * * * *